(12) United States Patent
Ishibashi

(10) Patent No.: US 7,000,039 B2
(45) Date of Patent: Feb. 14, 2006

(54) INFORMATION PROCESSING APPARATUS FOR RECORDING STREAMING DATA IN A STORAGE DEVICE

(75) Inventor: Yasuhiro Ishibashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 213 days.

(21) Appl. No.: 10/620,523

(22) Filed: Jul. 16, 2003

(65) Prior Publication Data

US 2004/0073948 A1    Apr. 15, 2004

(30) Foreign Application Priority Data

Jul. 16, 2002    (JP) .............................. 2002-207500

(51) Int. Cl.
*G06F 13/14* (2006.01)
(52) U.S. Cl. .............................. 710/74; 710/5; 710/52; 386/124; 386/125
(58) Field of Classification Search ................. 386/67, 386/68, 82, 92, 105, 106, 124–126; 725/89, 725/134, 142; 709/203; 710/62
See application file for complete search history.

(56) References Cited

U.S. PATENT DOCUMENTS 5,826,044 A    10/1998    Zenda
5,907,686 A    5/1999    Zenda
6,862,401 B1 *    3/2005    Higashida et al. .......... 386/100
2002/0141739 A1 *    10/2002    Takahashi ................... 386/111

FOREIGN PATENT DOCUMENTS

JP    2001-101794    4/2001
JP    2001-358966    12/2001

OTHER PUBLICATIONS

Japanese Office Action dated Sep. 13, 2004.

* cited by examiner

*Primary Examiner*—Ilwoo Park
(74) *Attorney, Agent, or Firm*—Pillsbury Winthrop Shaw Pittman LLP

(57) ABSTRACT

An information processing apparatus includes a first bus to transfer various data. A first processor is provided to manage, as a file, data recorded in the storage device. A receiver is provided to receive externally supplied streaming data. A second bus is provided to transfer the streaming data received by the receiver. A third bus is electrically connected to the storage device. A second processor is electrically connected to the first bus, the second bus, and the third bus. Streaming data from the receiver via the second bus is stored in the storage device via the third bus. File management information from the first processor via the first bus is also stored in the storage device, in response to an access request from the first processor via the first bus.

25 Claims, 9 Drawing Sheets

INFORMATION PROCESSING APPARATUS FOR RECORDING STREAMING DATA IN A STORAGE DEVICE

CROSS-REFERENCE TO RELATED APPLICATIONS

This application is based upon and claims the benefit of priority from prior Japanese Patent Application No. 2002-207500, filed Jul. 16, 2002.

BACKGROUND OF THE INVENTION

1. Field of the Invention

The present invention relates generally to an information processing apparatus, and more particularly to an information processing apparatus capable of recording streaming data, such as broadcast program data, in a disk storage device.

2. Description of the Related Art

In recent years, information processing apparatuses with multimedia functions, such as personal computers and game machines, have been developed. These information processing apparatuses can handle various content data such as video and audio.

Home network systems have been developed, which interconnect household electronic devices, such as a personal computer, a game machine, a TV, and audio equipment.

In the home network system, various content data is stored in a home server. The content data stored in the home server can be used among the devices connected to the home server via the network.

Japanese Patent Application KOKAI Publication No. 2001-358966 discloses a system that provides transmission services of TV broadcast programs received by a tuner device, and Internet browsing services.

It is thus required that the home server can handle various streaming data such as broadcast content and Internet content using streaming technology. However, the size of streaming data is enormous, and there is a danger that a bus in the home server may completely be occupied by transfer of certain streaming data.

Assume a case where streaming data of broadcast content received by a TV tuner is to be stored in a storage device such as a disk. This case requires transfer of streaming data from the TV tuner to a CPU and also transfer of the streaming data from the CPU to the storage device. As a result, the same streaming data flows twice through the bus in the home server. This result leads to an increase in bus traffic and considerable degradation in the performance of the home server.

BRIEF SUMMARY OF THE INVENTION

An object of the present invention is to provide an information processing apparatus capable of efficiently processing streaming data, without incurring an increase in bus traffic.

According to an embodiment of the present invention, there is provided an information processing apparatus that includes a first bus to transfer various data. A first processor is provided to manage, as a file, data recorded in the storage device. A receiver is provided to receive externally supplied streaming data. A second bus is provided to transfer the streaming data received by the receiver. A third bus is electrically connected to the storage device. A second processor is electrically connected to the first bus, the second bus, and the third bus. Streaming data from the receiver via the second bus is stored in the storage device via the third bus. File management information from the first processor via the first bus is also stored in the storage device, in response to an access request from the first processor via the first bus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

An embodiment of the present invention will now be described with reference to the accompanying drawings.

Figure 1:
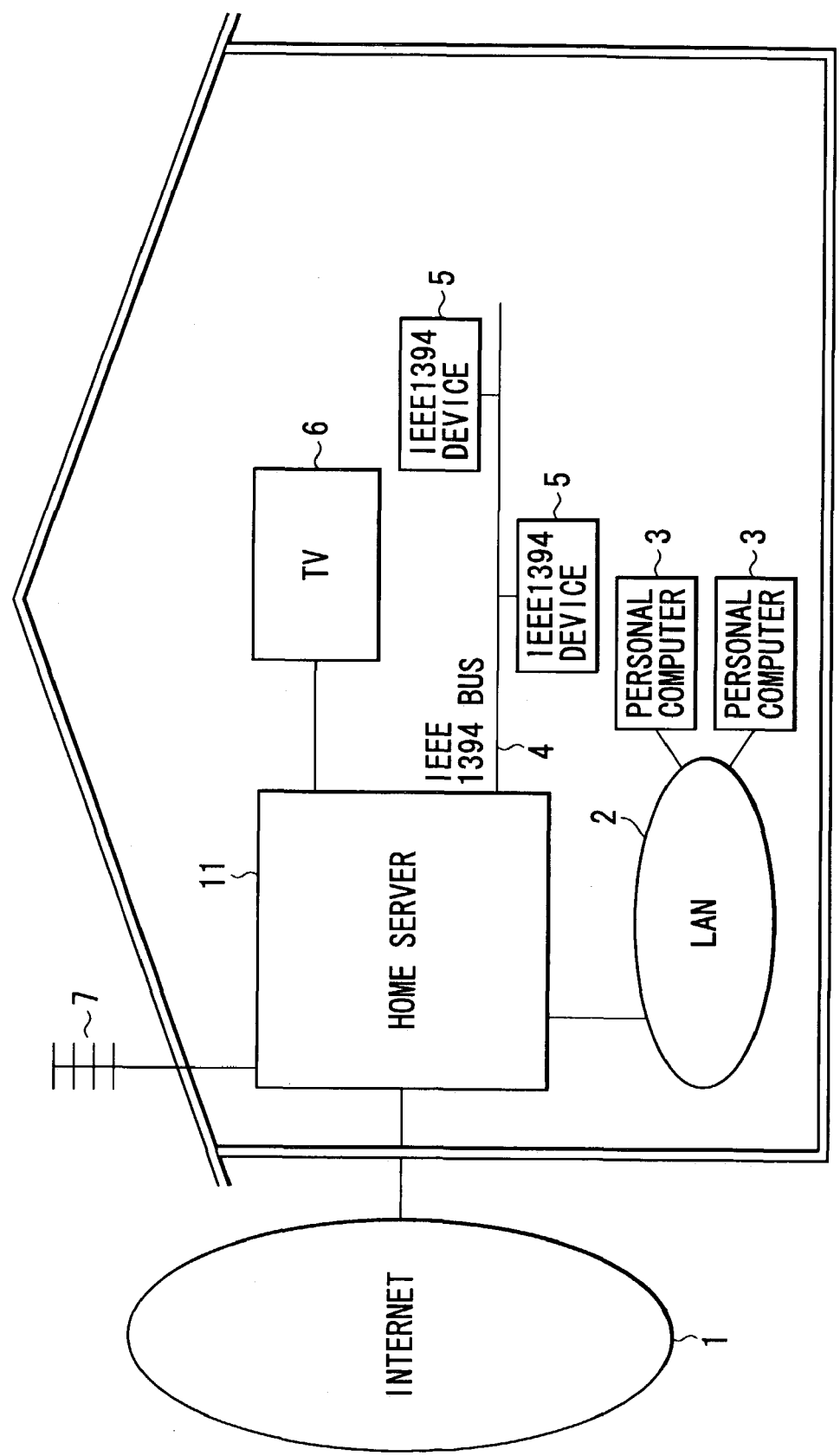
FIG. 1 is a block diagram showing a structure of a home network system according to an embodiment of the present invention.

FIG. 1 shows the structure of a home network system using an information processing apparatus according to an embodiment of the present invention. The information processing apparatus functions as a home server 11. The home server 11 is a server used for constructing a home network system. The home server 11 is connected to various household electronic appliances, that is, personal computers (PC) 3, IEEE 1394 devices 5 such as a camera, and a TV set 6.

The home server 11 and each personal computer (PC) 3 are connected via a wired or wireless LAN (Local Area Network) 2. The home server 11 and each IEEE 1394 device 5 are connected via an IEEE 1394 bus 4.

The home server 11 provides each personal computer (PC) 3 with services relating to listening/viewing of broadcast content such as TV programs, and Internet browsing.

The home server 11 connects each personal computer 3 to the Internet 1, and performs data transmission/reception between Web sites on the Internet 1 and each personal computer 3. In addition, the home server 11 is connected to a TV broadcast receiving antenna 7 and is able to receive broadcast content, e.g., TV programs, provided by satellite broadcasting such as BS (Broadcasting Satellite) and CS (Communications Satellite). Broadcast content received by the home server 11 can be reproduced by the TV set 6 and delivered to each personal computer 3 via the LAN 2.

Figure 2:
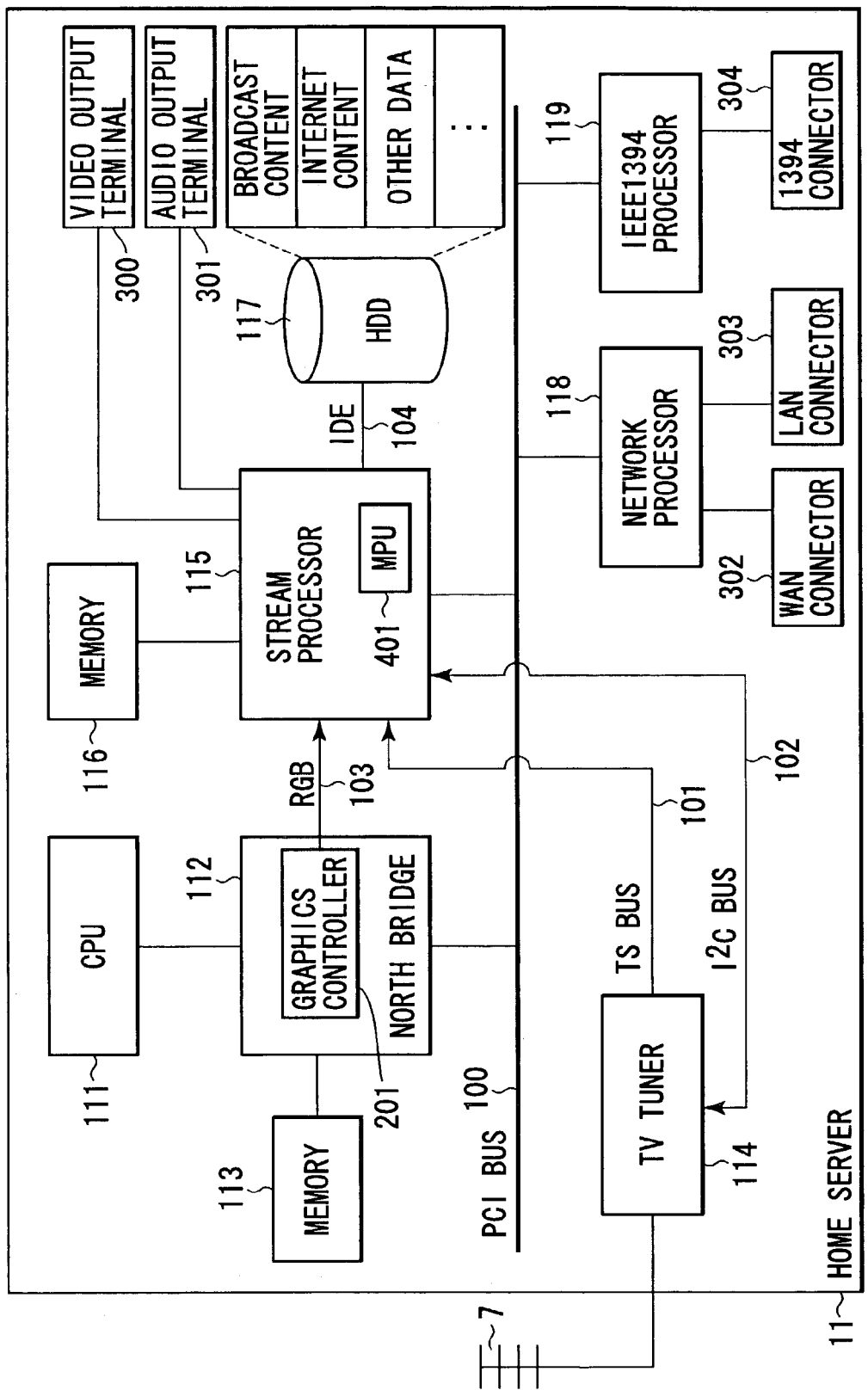
FIG. 2 is a block diagram showing a structure of a home server used in the home network system shown in FIG. 1.

FIG. 2 shows the system configuration of the home server 11. The home server 11 includes a CPU 111, a north bridge 112, a memory 113, a TV tuner 114, a stream processor 115, a disk storage device 117, a network processor 118, and an IEEE 1394 processor 119.

The CPU 111 is a processor for controlling the entirety of the home server 11. The CPU 111 executes an operating system (OS) that is loaded from the disk storage device (HDD) 117 into the memory 113, and various application programs. The operating system includes a file system and manages, as files, various content data which are recorded in the disk storage device 117. The CPU 111 executes a control to write/read data in/from the disk storage device 117. The CPU 111 is connected to a PCI (Peripheral Component Interconnect) bus 100 via the north bridge 112. The PCI bus 100 is a bus used for various data transfer between the connected devices.

The TV tuner 114 is a receiver for receiving broadcast content data such as TV programs, which is provided by satellite broadcasting such as BS and CS. The broadcast content data provided by the satellite broadcasting is composed of compression-encoded streaming data called MPEG2 transport stream (TS). The TV tuner 114 is connected to the stream processor 115 via a dedicated bus (TS bus) 101 for transferring streaming data (TS).

Streaming data (TS) received by the TV tuner 114 is transferred to the stream processor 115 via the TS bus 101, without the streaming data (TS) flowing through the PCI bus 100. The TV tuner 114 is also connected to the stream processor 115 via a serial bus, e.g. an Inter-IC ($I^2C$) bus 102. The $I^2C$ bus 102 is used as a control bus via which the stream processor 115 controls the TV tuner 114. For example, control information indicative of to which channel a TV program to be received belongs, is sent from the stream processor 115 to the TV tuner 114 via the $I^2C$ bus 102.

The stream processor 115 is a processor provided to execute a process relating to streaming data. The stream processor 115 is electrically connected to the PCI bus 100, TS bus 101, and $I^2C$ bus 102. The stream processor 115 is also electrically connected to the disk storage device 117 via an IDE (Integrated Drive Electronics) bus 104.

The stream processor 115 includes a microprocessor unit (MPU) 401. The MPU 401 executes a driver program for controlling the disk storage device 117 and a driver program for processing streaming data.

The stream processor 115 operates while executing inter-processor communication with the CPU 111. In response to a disk access request sent from the CPU 111 via the PCI bus 100, the stream processor 115 performs an access control to access the disk storage device 117 via the IDE bus 104. Specifically, in response to a write access request from the CPU 111, the stream processor 115 executes a write process to write in the disk storage device 117 data input via the PCI bus 100 and file management information for managing the input data as a file. In addition, in response to a read access request from the CPU 111, the stream processor 115 executes a read-out process to read out the data of the file from the disk storage device 117 onto the PCI bus 100.

The file management information includes disk addresses of respective data items constituting files, and the associated file access rights information. In the case of the file system of UNIX™, for instance, an i-node corresponds to file management information. The i-node is a data structure for managing the associated file/directory. One i-node is provided for one file. Using an i-node list, the CPU 111 manages each file stored in the disk storage device 117. The i-node list is a set of i-nodes corresponding to all files stored in the disk storage device 117. Each i-node stored in the disk storage device 117 is referred to by the corresponding i-node number. The i-node number is a file identifier for uniquely identifying each file. The i-node number is used as an index for retrieving the content of the i-node of the corresponding file on the basis of the file name. Normally, the file name and the i-node number are associated in one-to-one correspondence.

The data input/output to/from the disk storage device 117 is normally performed via the PCI bus 100. For example, data transfer between the memory 113 and disk storage device 117 is performed via the PCI bus 100.

On the other hand, when broadcast content data is to be written in the disk storage device 117, the data to be written in the disk storage device 117 is transferred from the TV tuner 114 to the stream processor 115 via the TS bus 101. The PCI bus 100 is not used. Only file management information for managing broadcast content data as files is transferred from the CPU 111 to the stream processor 115 via the PCI bus 100.

A memory 116 is connected to the stream processor 115. The memory 116 is used as a working area for each program executed by the stream processor 115, and also as a buffer memory for temporarily storing streaming data transferred from the TV tuner 114.

The memory 116 is assigned to a part of a memory address space accessible by the CPU 111. That is, the memory 116 is shared by the stream processor 115 and CPU 111, and inter-processor communication between the stream processor 115 and CPU 111 is effected through the memory 116.

Needless to say, without using the shared memory 116, the inter-processor communication may be effected by transmitting/receiving messages between the stream processor 115 and CPU 111 via the PCI bus 100 or a dedicated inter-processor bus. The memory 116 may be built in the stream processor 115.

The stream processor 115 has a function of decoding and reproducing streaming data of broadcast content recorded in the disk storage device 117, in accordance with an instruction from the CPU 111. The stream processor 115 decodes video data included in the streaming data of broadcast content. Then, the stream processor 115 converts the decoded video data to a video signal for TV output, and supplies the video signal to the external TV set 6 via a video output terminal 300. Similarly, the stream processor 115 decodes and reproduces audio data included in the streaming data of broadcast content, and supplies an audio signal corresponding to the audio data to the TV set 6 or some other audio equipment via an audio output terminal 301.

Streaming data, which can be decoded and reproduced by the stream processor 115, is an MPEG2 transport stream (TS).

The disk storage device 117 comprises a hard disk drive (HDD). The disk storage device 117 is connected to the stream processor 115 via the IDE bus 104. The disk storage device 117 is used to record various content data (broadcast content, Internet content, etc.). Any content data recorded in the disk storage device 117 is managed as a file by the CPU 111. Thus, by issuing a disk access request to the stream processor 115, the CPU 111 can read out a desired content file from the disk storage device 117.

As has been described above, the process for reproducing the broadcast content data such as TV programs is performed by the stream processor 115. On the other hand, the process for reproducing streaming data such as Internet content using streaming techniques is performed by the CPU 111. More specifically, a Web browser executed by the CPU 111 or a plug-in program that plugs into the Web browser executes the Internet content reproducing process.

The home server 11, as described above, handles streaming data of two different data formats (broadcast content and Internet content). The home server 11 enables the TV set 6 to display streaming data of each format.

Assume a case where Internet content streaming data is listened/viewed by the TV set 6. The Internet content streaming data is decoded by the CPU 111 and then sent to a graphics controller 201 built in the north bridge 112. The graphics controller 201 converts the decoded streaming data to a video signal for display (e.g. RGB signal) and delivers the video signal to the stream processor 115 via a video bus 103. The stream processor 115 converts the video signal input via the video bus 103 to a video signal for TV output, and outputs the video signal from the video output terminal 300.

The disk storage device 117 is also usable as a network drive. In this case, the content data recorded in the disk storage device 117 can be referred to by each personal computer 3 on the LAN 2.

The network processor 118 is a dedicated processor for communication control, which connects the home server 11 to the LAN 2 and Internet 1. The network processor 118 functions as a router and an access point. The network processor 118 is connected to the PCI bus 100.

The network processor 118 has a WAN connector 302 for connection to the Internet 1 and a LAN connector 303 for connection to the LAN 2. The network processor 118 includes an MPU and can perform, where necessary, inter-processor communication with the CPU 111 and stream processor 115.

By the inter-processor communication with the stream processor 115, the network processor 118 can acquire via the stream processor 115 the content data stored as files in the disk storage device 117. Specifically, in a case where content data stored in the disk storage device 117 is to be sent to the personal computer 3 on the LAN 2, the network processor 118 issues a disk access request to the stream processor 115 via the PCI bus 100. Thereby, the network processor 118 reads out of the disk storage device 117 streaming data such as broadcast content, which has been requested from the personal computer 3, and delivers the read-out streaming data to the requesting personal computer 3.

The IEEE 1394 processor 119 is a processor for controlling communication between the home server 11 and each IEEE 1394 device 5. The IEEE 1394 processor 119 is connected to the PCI bus 100. The IEEE 1394 processor 119 includes an MPU and can perform, where necessary, inter-processor communication with the CPU 111 and stream processor 115.

By the inter-processor communication with the stream processor 115, the IEEE 1394 processor 119 can acquire via the stream processor 115 the content data stored in the disk storage device 117. Specifically, in a case where content data stored in the disk storage device 117 is to be sent to the IEEE 1394 device 5 on the IEEE 1394 bus 4, the IEEE 1394 processor 119 issues a disk access request to the stream processor 115 via the PCI bus 100. Thereby, the IEEE 1394 processor 119 reads out of the disk storage device 117 such streaming data as broadcast content, which has been requested from the IEEE 1394 device 5, and delivers the read-out streaming data to the requesting IEEE 1394 device 5.

Figure 3:
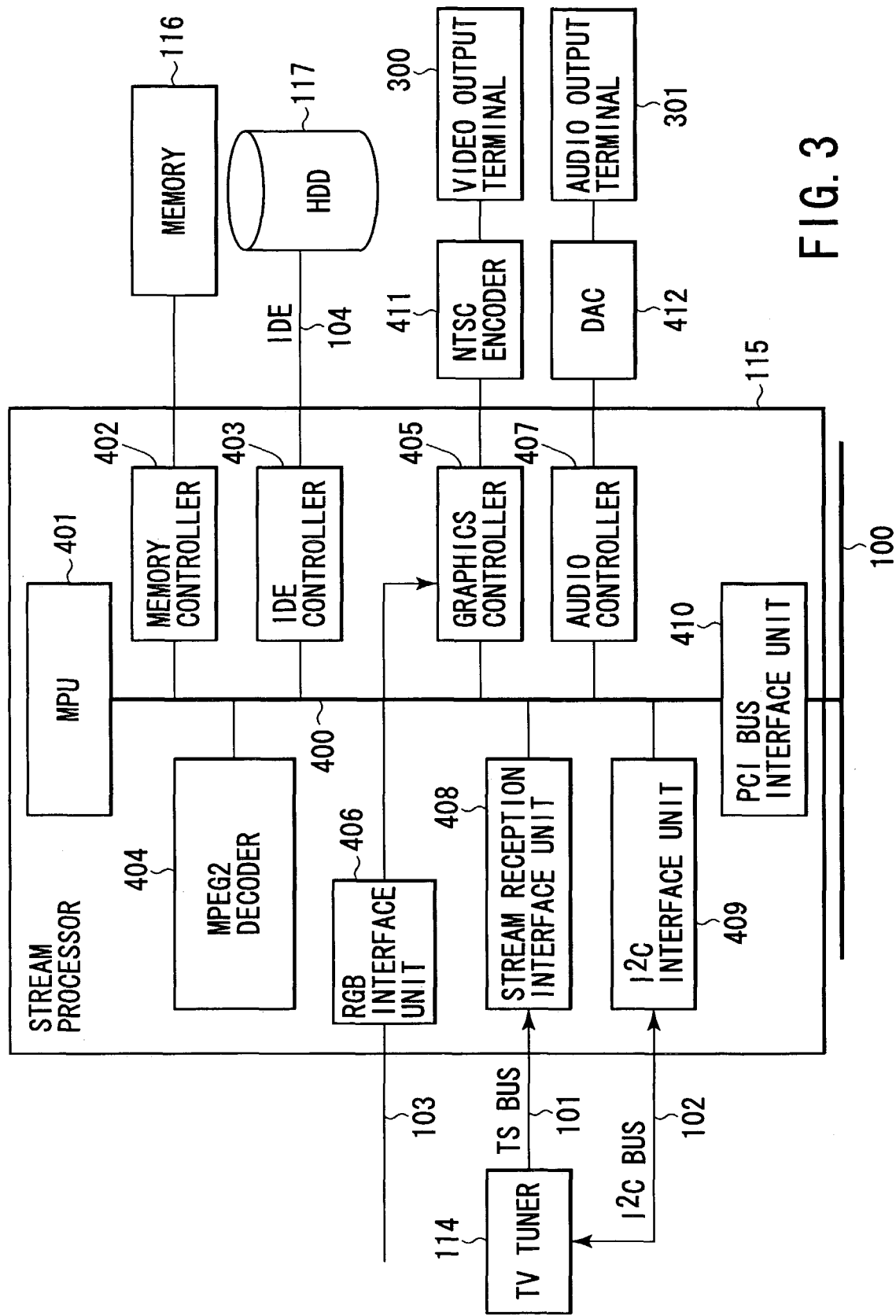
FIG. 3 is a block diagram showing a structure of a stream processor provided in the home server shown in FIG. 2.

FIG. 3 shows the internal structure of the stream processor 115.

As is shown in FIG. 3, in addition to the aforementioned MPU 401, a memory controller 402, an IDE controller 403, an MPEG2 decoder 404, a graphics controller 405, an RGB interface unit 406, an audio controller 407, a stream reception interface unit 408, an I$^2$C interface unit 409, and a PCI bus interface unit 410 are connected to an internal bus 400 in the stream processor 115.

The memory controller 402 and IDE controller 403 control the aforementioned memory 116 and disk storage device 117, respectively. The MPEG2 decoder 404 decodes an MPEG2 transport stream. In the decoding process, the MPEG2 transport stream is first separated into video data and audio data, following which a video data decoding process and an audio data decoding process are executed.

The graphics controller 405 converts the video data, which has been decoded by the MPEG2 decoder 404, to a video signal (e.g., digital video, analog video, DVI, etc.) for TV output. In a case where an NTSC-system TV set is used, a video signal obtained by the graphics controller 405 is converted to an NTSC signal by an NTSC encoder 411.

The RGB interface unit 406 is connected to the graphics controller 405. The RGB interface unit 406 is an interface that receives video data (RGB) input via the video bus 103. Video data (RGB) received by the RGB interface unit 406 is sent to the graphics controller 405 and converted therein to a video signal (e.g. digital video, analog video, DVI, etc.) for TV output.

The audio controller 407 is a sound generation device that converts audio data, which has been decoded by the MPEG2 decoder 404, to sound data. The sound data (digital signal) obtained by the audio controller 407 is converted to an analog signal by a D/A converter (DAC) 412, and the analog signal is output from the audio output terminal 301.

The stream reception interface unit 408 receives streaming data from the TV tuner 114 via the TS bus 101. The streaming data received by the stream reception interface unit 408 is written in the memory 116 by the memory controller 402. The I$^2$C interface unit 409 sends channel select control information to the TV tuner 114 via the I$^2$C bus 102. The PCI bus interface unit 410 is a unit for bi-directionally connecting the PCI bus 100 and internal bus 400.

A flow of content data in the home server 11 will now be described with reference to FIGS. 4 to 6.

Figure 4:
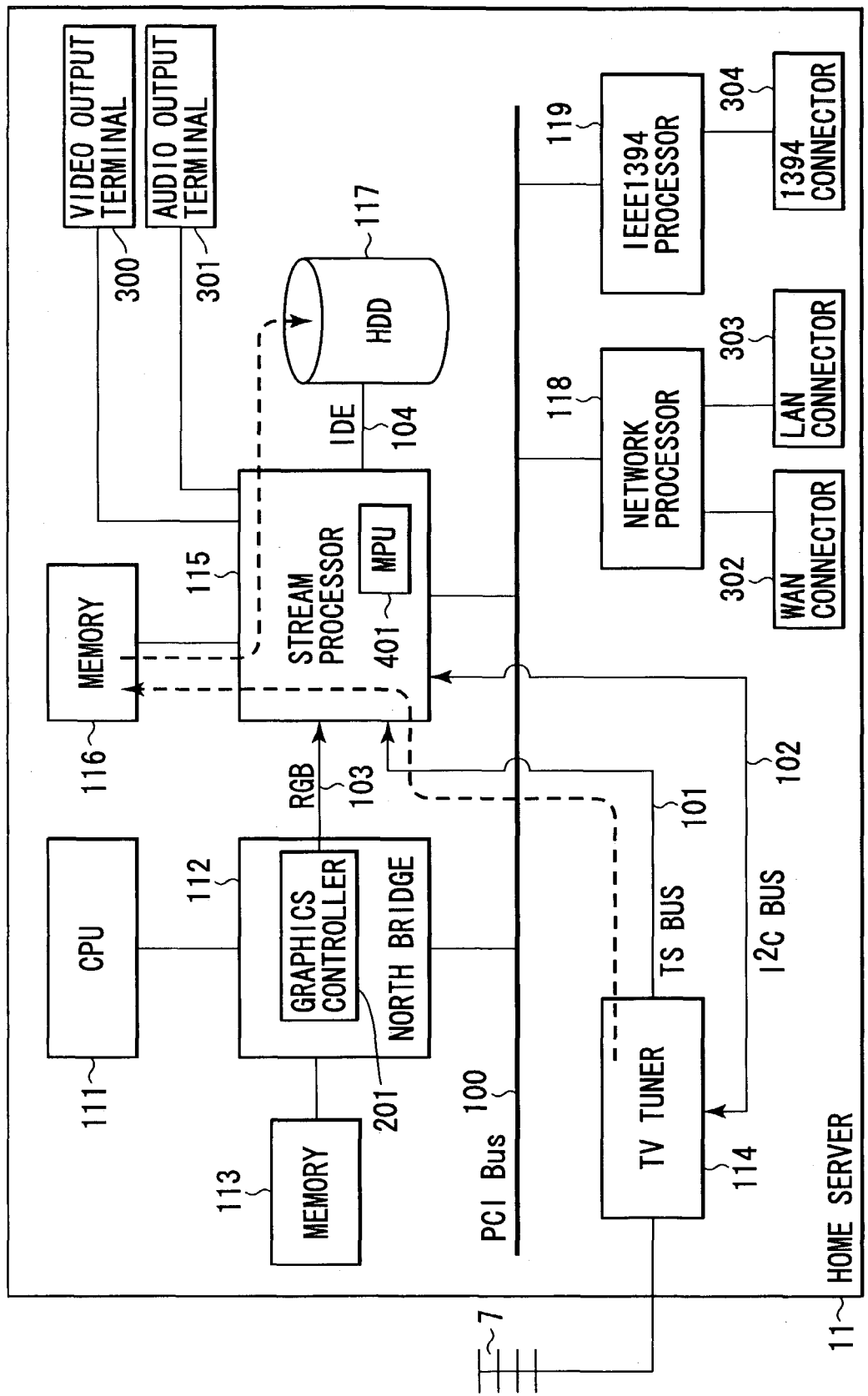
FIG. 4 illustrates a flow of broadcast content data in the home server shown in FIG. 2 from the reception thereof to a storage in a disk storage device.

FIG. 4 illustrates a flow of data from reception of broadcast content data to storage in the disk storage device 117.

Broadcast content streaming data received by the TV tuner 114 is transferred to the stream processor 115 via the TS bus 101. The streaming data is buffer-stored in the memory 116 connected to the stream processor 115. The buffered streaming data is written as a file in the disk storage device 117 on the basis of a disk access request sent from the CPU 111. The disk access request includes a memory address indicative of a location of write data, a data size of write data, and a disk address (sector number) of a write destination. File management information for managing streaming data as a file is sent from the CPU 111 to stream processor 115 via the PCI bus 100. The file management information is written in an i-node list area in the disk storage device 117.

As has been described above, the home server 11 has, in addition to the PCI bus 100, the TS bus 101 for transferring the streaming data received by the TV tuner 114 from the TV tuner 114 to the stream processor 115. Thereby, the streaming data can be transferred from the TV tuner 114 to the stream processor 115 such that the streaming data does not flow through the PCI bus 100. Moreover, the stream processor 115 is connected to the disk storage device 117 via the IDE bus 104. Thus, the streaming data, which has been transferred from the TV tuner 114, can be transferred as write data to the disk storage device 117 such that the streaming data does not flow through the PCI bus 100.

Therefore, only by transferring the file management information from the CPU 111 to the stream processor 115 via the PCI bus 100, the streaming data can be recorded as a file in the disk storage device 117 under control of the CPU 111 without the streaming data flowing through the PCI bus 100.

Figure 5:
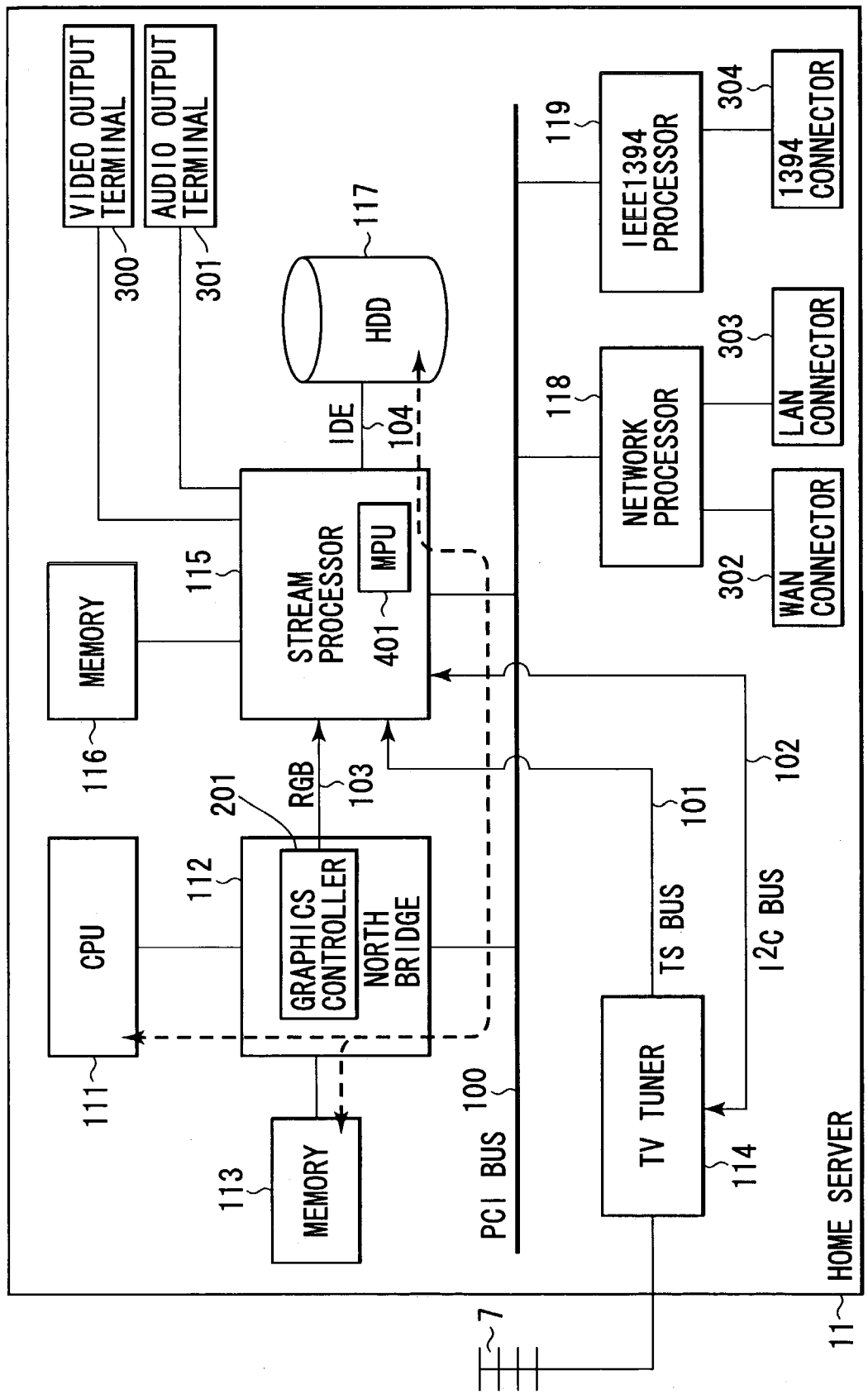
FIG. 5 illustrates a data flow between the disk storage device and a CPU in the home server shown in FIG. 2.

FIG. 5 illustrates a flow of data between the disk storage device 117 and CPU 111.

As described above, all content recorded in the disk storage device 117 is managed as files by the CPU 111. Thus, the CPU 111 can transmit/receive all data to/from the disk storage device 117, irrespective of the kind of content. Specifically, the CPU 111 recognizes a disk address indicative of a data storage location of data constituting each file, on the basis of an i-node list read out from the disk storage device 117, and issues a disk access request, which instructs data read-out from the disk address, to the stream processor 115 via the PCI bus 100.

Data read out of the disk storage device 117 by the stream processor 115 is transferred to the memory 113 or CPU 111 via the PCI bus 100. On the other hand, data to be stored in the disk storage device 117 is sent from the memory 113 or CPU 111 to the stream processor 115 via the PCI bus 100.

Figure 6:
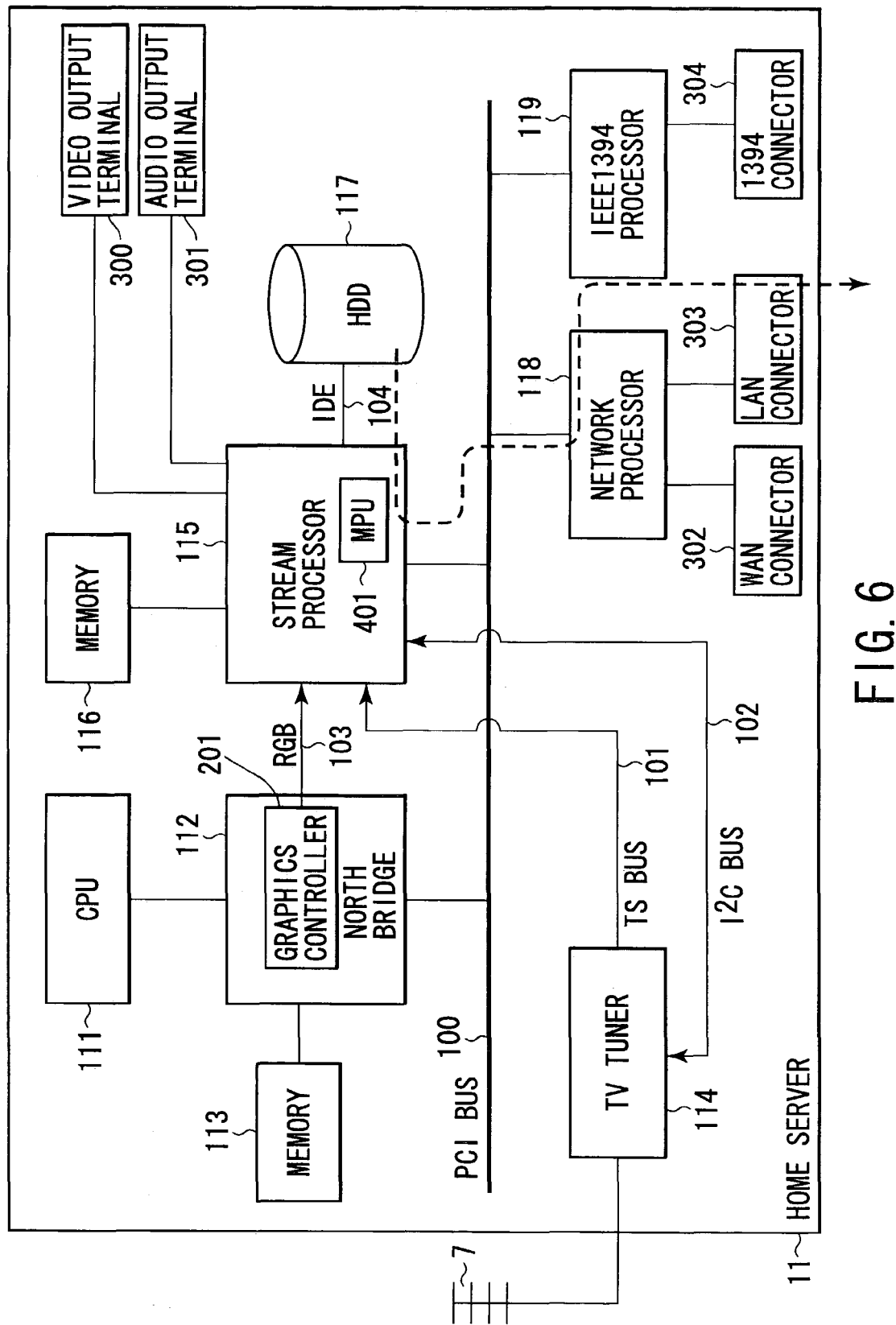
FIG. 6 illustrates a data flow in a case where broadcast content data stored in the disk storage device in the home server shown in FIG. 2 is transmitted to a personal computer.

FIG. 6 illustrates a data flow in a case where broadcast content data stored in the disk storage device 117 is transmitted to the personal computer 3 on the LAN 2.

The network processor 118, like the stream processor 115, is a processor independent from the CPU 111. Thus, the network processor 118 can issue to the stream processor 115 a disk access request for instructing data read-out. A disk address of data constituting a file to be read out can be recognized from the i-node list. The network processor 118 can directly acquire the i-node list from the disk storage device 117 via the stream processor 115. Alternatively, the i-node list may be acquired via the CPU 111.

The disk access request from the network processor 118 is sent to the stream processor 115 via the PCI bus 100. Broadcast content data stream read out of the disk storage device 117 by the stream processor 115 is sent to the network processor 118 via the PCI bus 100. The network processor 118 packetizes the streaming data and transmits the packetized data to the personal computer 3 on the LAN 2.

In this manner, the streaming data read out of the disk storage device 117 is sent to the network processor 118, without the streaming data flowing via the CPU 111 or memory 113. Besides the broadcast content streaming data, all content data recorded in the disk storage device 117 can be transferred to the network processor 118 from the stream processor 115 according to the same procedures.

Figure 7:
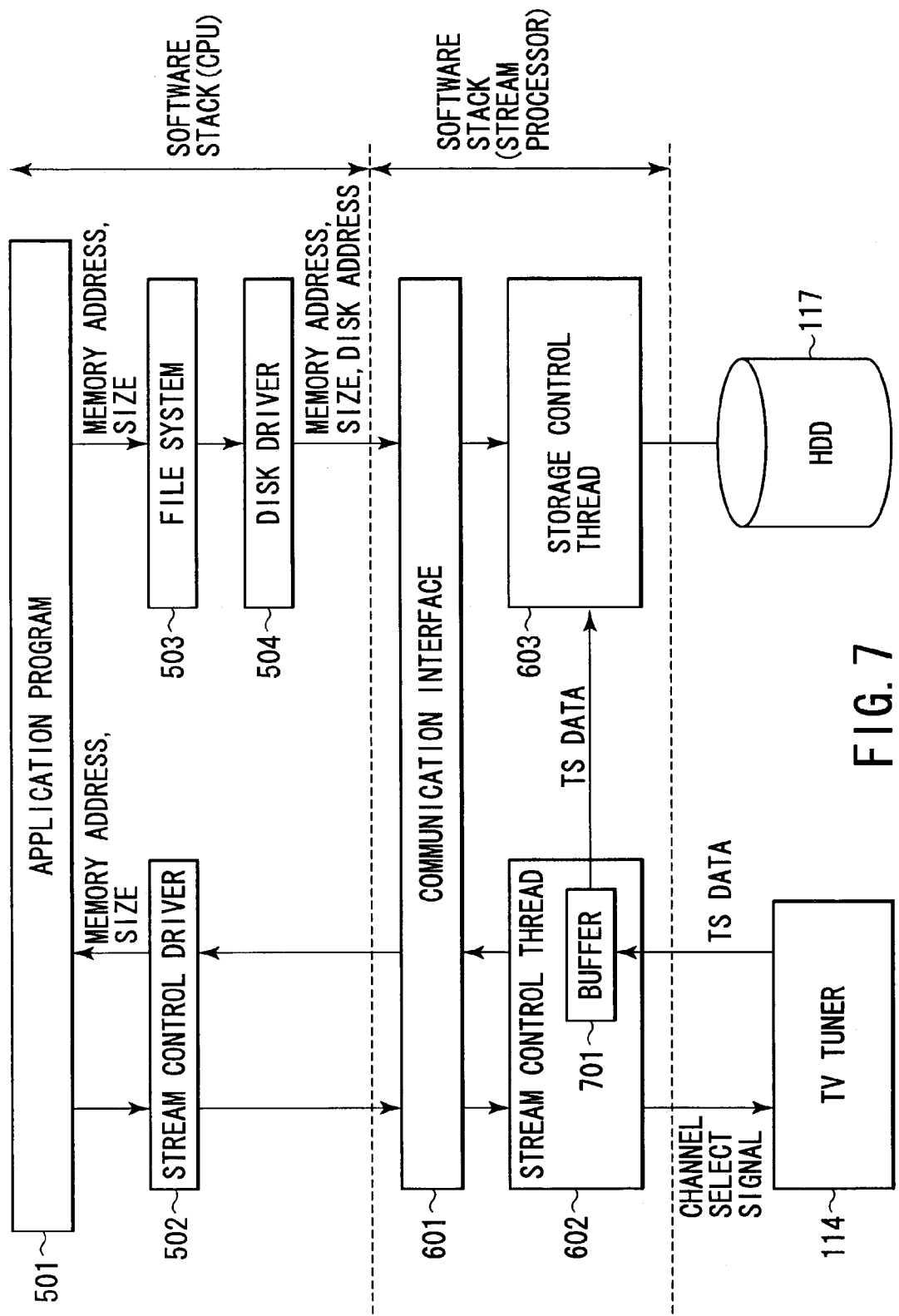
FIG. 7 illustrates inter-processor communication executed between the CPU and stream processor provided in the home server shown in FIG. 2.

FIG. 7 illustrates inter-processor communication executed between the CPU 111 and stream processor 115 in the case of storing broadcast content data in the disk storage device 117.

In FIG. 7, an application program 501, a stream control driver 502, a file system 503 and a disk driver 504 are software programs executed by the CPU 111. A communication interface 601, a stream control thread 602 and a storage control thread 603 are software programs executed by the stream processor 115.

The application program 501 is a program for controlling recording of broadcast content. The application program 501 executes a process for sending to the stream processor 115 via the stream control driver 502 a channel instruction indicative of the channel number for TV program reception, and a process for asking the file system 503 to store streaming data.

The stream control driver 502 and disk driver 504 executed by the CPU 111 communicate with the communication interface 601 executed by the stream processor 115.

The channel instruction from the stream control driver 502 is sent to the stream control thread 602 via the communication interface 601. The stream control thread 602 executes a process for receiving streaming data from the TV tuner 114 by controlling the stream reception interface unit 408, $I^2C$ interface unit 409 and memory controller 402 in the stream processor 115, and a process for storing the received streaming data in a buffer memory 701. The channel instruction is sent to the TV tuner 114 via the $I^2C$ interface unit 409 and $I^2C$ bus 102.

Figure 8:
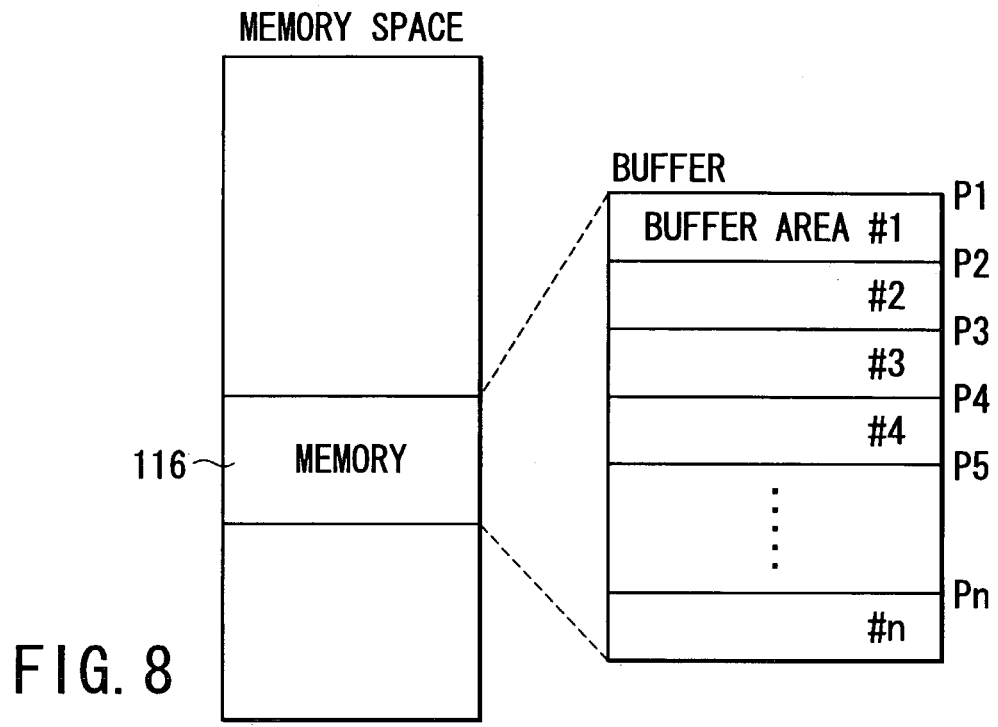
FIG. 8 is a view for explaining a buffer memory of the stream processor provided in the home server shown in FIG. 2.

The buffer memory 701 is a memory area provided in the memory 116. The buffer memory 701 includes a plurality of buffer areas (#1 to #n), as shown in FIG. 8. The buffer areas (#1 to #n) are logically connected in a ring-like fashion. The buffer areas, in which streaming data is to be stored, are sequentially switched in an order such as #1, #2, . . . , #n, #1, . . . .

If the size of an empty portion in the buffer area #1 currently used as a storage destination decreases to a predetermined level, the stream control thread 602 switches the buffer area of the storage destination to the next buffer area #2. Then, the stream control thread 602 notifies the CPU 111 via the communication interface 601 of pointer information including a memory address (P1) of buffer area #1 and the data size of the streaming data stored in the buffer area #1.

The pointer information is sent to the application program 501 via the stream control driver 502. Based on the pointer information, the application program 501 can recognize the location of write data to be written in the disk storage device 117 and the data size of the write data. The pointer information is delivered to the file system 503 from the application program 501.

The file system 503 cooperates with the disk driver 504 and generates, on the basis of the pointer information, a disk access request instructing that the associated data in the buffer memory 701 is to be written in the disk storage device 117. The disk access request includes a disk address indicative of a sector number of a data write destination, as well as the memory address of the write data and the data size of the write data. The generated disk access request is sent to the stream processor 115.

In the stream processor 115, the disk access request is sent to the storage control thread 603 via the communication interface 601. The storage control thread 603 is a program for controlling the IDE controller 403, thereby executing a data write process for writing data in the disk storage device 117, and a data read-out process for reading out data from the disk storage device 117.

Upon receiving the above-mentioned disk access request, the storage control thread 603 executes a process for writing write data, which is present in the memory 116 and designated by the memory address and data size included in the disk access request, into a sector designated by the disk address included in the disk access request. In the write process, data retained in the buffer memory 701 is written in the disk storage device 117.

The storage control thread 603 also executes a write process for writing file management information, which is sent from the file system 503 via the PCI bus 100, into an i-node list area in the disk storage device 117. Thereby, the streaming data can be managed as a file.

Figure 9:
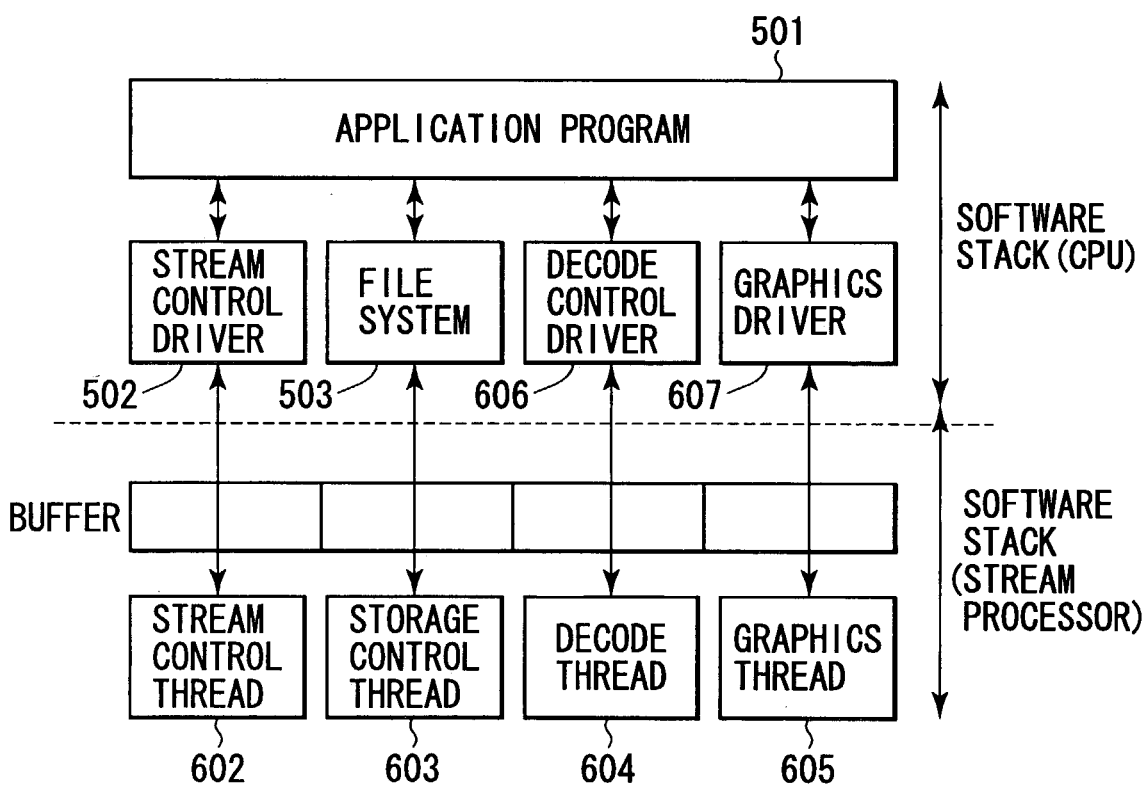
FIG. 9 illustrates a relationship between a software stack executed by the CPU and a software stack executed by the stream processor provided in the home server shown in FIG. 2.

FIG. 9 illustrates the relationship between a software stack executed by the CPU 111 and a software stack executed by the stream processor 115.

The stream processor 115 executes a decode thread 604 and a graphics thread 605, in addition to the aforementioned stream control thread 602 and storage control thread 603. The decode thread 604 is a program for executing a process for decoding a MPEG2 transport stream, using the MPEG2 decoder 404. The decoding process is executed in accordance with a decode instruction sent from a decode control driver 606 executed by the CPU 111. The graphics thread 605 is a program for executing a video reproducing process for generating a video signal for TV display on the basis of the decoded video data. The video reproducing process is executed in accordance with a reproduction instruction sent from a graphics driver 607 executed by the CPU 111.

The four threads executed by the stream processor 115, i.e. the stream control thread 602, storage control thread 603, decode thread 604 and graphics thread 605, are independently operable. Buffer memories corresponding to the stream control thread 602, storage control thread 603, decode thread 604 and graphics thread 605 are assigned to the memory 116. The stream control thread 602, storage control thread 603, decode thread 604 and graphics thread 605 communicate, via the associated buffer memories, with the stream control driver 502, file system 503, decode control driver 606 and graphics driver 607 executed by the CPU 111.

Figure 10:
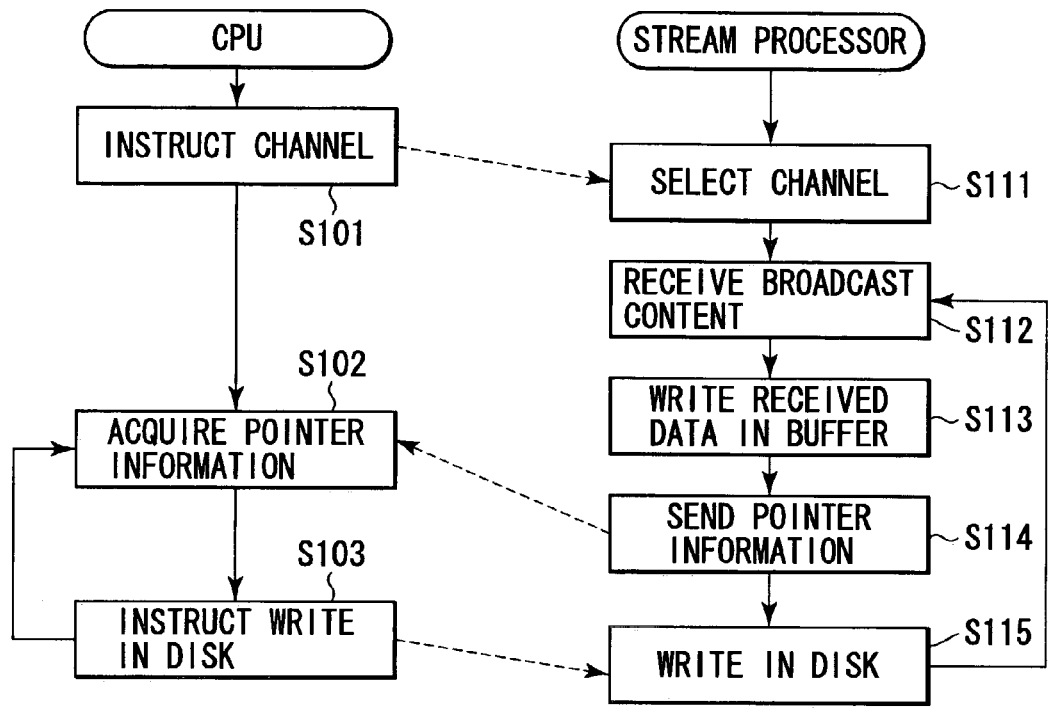
FIG. 10 is a flow chart illustrating a procedure of a streaming data recording process executed by the home server shown in FIG. 2.

Referring to a flow chart of FIG. 10, a description will now be given of a procedure of a process for recording broadcast content data in the disk storage device 117.

The CPU 101 issues a channel instruction, which is indicative of a channel number of broadcast content data to be received, to the stream processor 115 via the PCI bus 100 (step S101). Based on the channel instruction received from the CPU 111, the stream processor 115 transmits control information indicative of a channel, to which the broadcast content data to be received belongs, to the TV tuner 114 via the I²C bus 102. Thereby, the channel of the broadcast content data to be received by the TV tuner 114 is selected (step S111). The TV tuner 114 receives the broadcast content data of the selected channel, and transmits the streaming data constituting the received broadcast content data to the stream processor 115 via the TS bus 101.

The stream processor 115 receives the streaming data from the TV tuner 114 via the stream reception interface unit 408. The stream processor 115 successively writes the received streaming data into the plural buffer memories provided in the memory 116 (steps S112 and S113). Each time the buffer memory, which is selected as a current write destination, is filled with the streaming data, the stream processor 115 switches the current write destination from the currently selected buffer memory to the next buffer memory. In addition, the stream processor 115 sends the aforementioned pointer information to the CPU 111 via the PCI bus 100 (step S114).

The CPU 111, upon acquiring the pointer information from the stream processor 115 (step S102), generates a disk access request on the basis of the acquired pointer information. The disk access request instructs writing of the data stored in the buffer memory into the disk storage device 117. The CPU 111 sends the disk access request to the stream processor 115 via the PCI bus 100 (step S103).

In response to the disk access request from the CPU 111, the stream processor 115 executes a process for writing the data, which is present in the buffer memory, into the disk storage device 117 (step S115). In step S115, the stream processor 115 also executes a process for writing file management information, which is sent to the stream processor 115 from the CPU 111 via the PCI bus 100, into the disk storage device 117.

Figure 11:
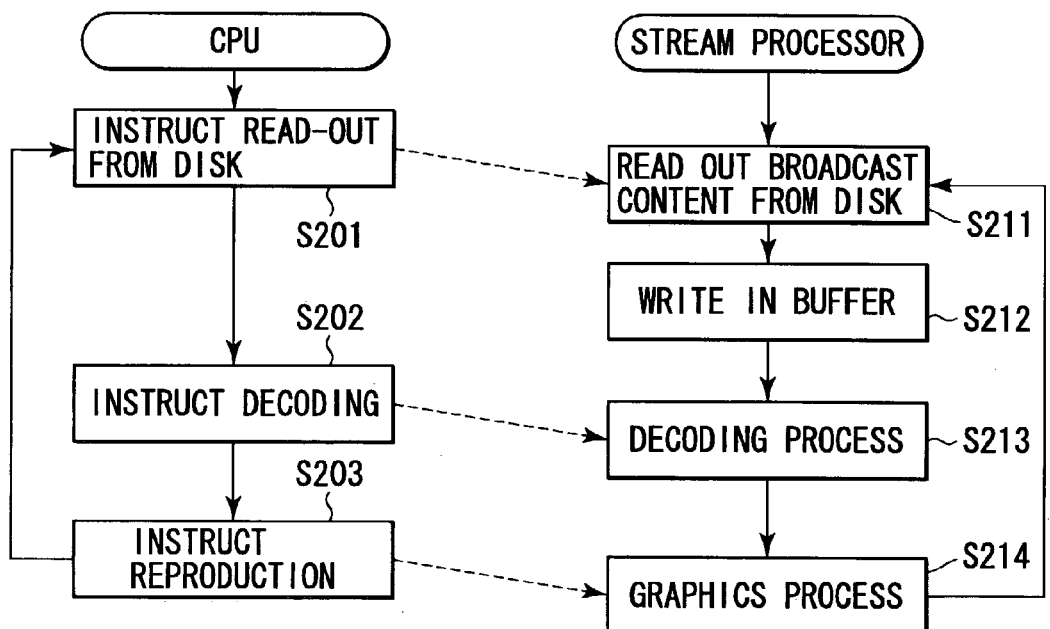
FIG. 11 is a flow chart illustrating a procedure of a streaming data decoding/reproducing process executed by the home server shown in FIG. 2.

Referring to a flow chart of FIG. 11, a description will now be given of a process for decoding and reproducing broadcast content data stored in the disk storage device 117.

The CPU 111 generates, on the basis of the i-node list, a disk access request for instructing read-out of to-be-reproduced broadcast content data from the disk storage device into the buffer memory. The CPU 111 sends the disk access request to the stream processor 115 via the PCI bus 100 (step S201). Responding to the disk access request from the CPU 111, the stream processor 115 reads out of the disk storage device 117 the streaming data constituting the broadcast content data to be decoded and reproduced, and writes the read-out streaming data in the buffer memory (step S211 and S212).

Thereafter, the CPU 111 sends a decode instruction and a reproduction instruction to the stream processor 115 via the PCI bus 100 (steps S202 and S203).

In accordance with the decode instruction from the CPU 111, the stream processor 115 decodes the streaming data present in the buffer memory (step S213). In addition, based on the reproduction instruction from the CPU 111, the stream processor 115 executes a process (graphics process) for converting the decoded streaming data to a video signal that can be reproduced and output from the TV set 6 (step S214).

In this manner, the broadcast content data is transferred to the disk storage device 117 such that the broadcast content data never flows through the PCI bus 100. Moreover, the broadcast content data stored in the disk storage device 117 is displayed on the TV set 6 such that the broadcast data never flows through the PCI bus 100.

The stream processor 115 does not only decode and reproduce the broadcast content data stored in the disk storage device 117. The stream processor 115 can also decode and reproduce broadcast content data in real time, while receiving it from the TV tuner 114.

As has been described above, the home server 11 according to the present embodiment includes not only the CPU 111, which manages data recorded as a file in the disk storage device 117, but also includes the stream processor 115 having the IDE controller 403 connected as the first interface to the disk storage device 117 and the stream reception interface unit 408 connected as the second interface to the TV tuner 114. Responding to the disk access request from the CPU 111, the stream processor 115 executes data write in the disk storage device 117 and data read-out from the disk storage device 117. By virtue of the use of the stream processor 115, the streaming data received by the TV tuner 114 can be recorded as a file in the disk storage device 117 under control of the CPU 111 without the streaming data flowing through the PCI bus 100.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus to record streaming data in a storage device, comprising:
   a first bus to transfer various data;
   a first processor that manages, as a file, data recorded in the storage device;
   a receiver that receives externally supplied streaming data;
   a second bus to transfer the streaming data received by the receiver;
   a third bus electrically coupled to the storage device; and
   a second processor electrically coupled to the first bus, the second bus, and the third bus, and storing in the storage device via the third bus the streaming data input from the receiver via the second bus and file management information input from the first processor via the first bus, in response to an access request input from the first processor via the first bus, wherein
   the second processor includes: a buffer memory assigned within a memory address space accessible by the first processor and temporarily stores the streaming data input from the receiver via the second bus; means for sending to the first processor, via the first bus, pointer information representing a memory address indicative of a storage location in the buffer memory where the streaming data is stored, and a data size of the stored streaming data, and the first processor includes: means for generating an access request for instructing the second processor to write the streaming data stored in the buffer memory into the storage device, based on the pointer information sent from the second processor; and means for sending the generated access request to the second processor via the first bus.

2. The information processing apparatus according to claim 1, wherein the streaming data received by the receiver includes compression-encoded video data, and the second processor includes: a decoder that decodes the streaming data stored in the storage device, in accordance with a decode request sent from the first processor via the first bus; and a video output interface that outputs the decoded streaming data to an external video monitor as video data, in accordance with a reproduction request sent from the first processor via the first bus.

3. The information processing apparatus according to claim 1 further including a control bus to connect the receiver and the second processor, wherein the receiver is a tuner unit that receives broadcast content data composed of streaming data, and the second processor transmits to the receiver via the control bus, control information indicative of a channel broadcast program to which data to be received belongs, in accordance with a channel select request input from the first processor via the first bus.

4. The information processing apparatus according to claim 1 wherein the streaming data is broadcast content data, and the receiver includes a tuner unit that receives the broadcast content data.

5. The information processing apparatus according to claim 1 wherein the information processing apparatus is coupled to a terminal via a network, and the information processing apparatus further includes a third processor electrically coupled to the first bus and communicating with the terminal on the network, the third processor issuing, to the second processor via the first bus, a disk access request instructing the second processor to read out the streaming data from the storage device, to transmit the streaming data stored in the storage device to the terminal via the network.

6. The information processing apparatus according to claim 1 further including a fourth bus that transfers display data to the second processor, wherein the second processor includes: an interface unit that receives the display data from the first processor via the fourth bus; and means for converting the display data received by the interface unit to video data, which is output to an external video monitor, in accordance with a reproduction request sent from the first processor via the first bus.

7. An information processing apparatus to record streaming data in a storage device, comprising:
   a first bus to transfer various data: a first processor that manages, as a file, data recorded in the storage device;
   a receiver that receives externally supplied streaming data; a second bus to transfer the streaming data received by the receiver;
   a third bus electrically coupled to the storage device;
   a second processor electrically coupled to the first bus, the second bus, and the third bus, and storing in the storage device via the third bus the streaming data input from the receiver via the second bus and file management information input from the first processor via the first bus, in response to an access request input from the first processor via the first bus; and
   a third processor electrically coupled to the first bus and communicating with a terminal on a network, the third processor issuing, to the second processor via the first bus, a disk access request instructing the second processor to read out the streaming data from the storage device, to transmit the streaming data stored in the storage device to the terminal via the network.

8. The information processing apparatus according to claim 7 wherein the streaming data is broadcast content data, and the receiver includes a tuner unit that receives the broadcast content data.

9. The information processing apparatus according to claim 7 wherein the second processor includes a buffer memory assigned within a memory address space accessible by the first processor and temporarily stores the streaming data input from the receiver via the second bus, and
   the first processor sends, to the second processor via the first bus, an access request for instructing the second processor to write the data stored in the buffer memory into the storage device.

10. An information processing apparatus to record streaming data in a storage device, comprising;
    a first bus to transfer various data; a first processor that manages, as a file, data recorded in the storage device;
    a receiver that receives externally supplied streaming data; a second bus to transfer the streaming data received by the receiver;

a third bus electrically coupled to the storage device;

a second processor electrically coupled to the first bus, the second bus, and the third bus, and storing in the storage device via the third bus the streaming data input from the receiver via the second bus and file management information input from the first processor via the first bus, in response to an access request input from the first processor via the first bus; and a fourth bus that transfers display data to the second processor, wherein the second processor includes: an interface unit that receives the display data from the first processor via the fourth bus; and means for converting the display data received by the interface unit to video data, which is output to an external video monitor, in accordance with a reproduction request sent from the first processor via the first bus.

11. The information processing apparatus according to claim 10 wherein the streaming data is broadcast content data, and the receiver includes a tuner unit that receives the broadcast content data.

12. The information processing apparatus according to claim 10 wherein the second processor includes a buffer memory assigned within a memory address space accessible by the first processor and temporarily stores the streaming data input from the receiver via the second bus, and the first processor sends, to the second processor via the first bus, an access request for instructing the second processor to write the data stored in the buffer memory into the storage device.

13. An information processing apparatus to record streaming data in a disk storage device, comprising:

a bus; a first processor that manages, as a file, data recorded in the disk storage device;

a receiver that receives externally supplied streaming data; and a second processor that executes, based on a disk access request input from the first processor, a write process to write data and file management information input via the bus into the disk storage device, and a read-out process to read out data constituting a file, which is stored in the disk storage device, onto the bus, the second processor including a first interface unit electrically coupled to the disk storage device, and a second interface unit electrically coupled to the receiver, and the second processor writing, when a disk access request from the first processor instructs writing the streaming data into the disk storage device, the streaming data input from the receiver to the second interface unit and file management information input from the first processor via the bus into the disk storage device via the first interface unit, wherein the second processor includes: a buffer memory assigned within a memory address space accessible by the first processor and temporarily stores the streaming data input to the second interface unit; means for sending to the first processor, via the bus, pointer information representing a memory address indicative of a storage location on the buffer memory where the streaming data is stored, and a data size of the stored streaming data, and the first processor includes: means for generating a disk access request to instruct the second processor to write the streaming data stored in the buffer memory into the disk storage device, based on the pointer information sent from the first processor; and means for sending the generated disk access request to the second processor via the first bus.

14. The information processing apparatus according to claim 13 wherein the streaming data received by the receiver includes compression-encoded video data, and the second processor includes: a third interface unit that outputs video data to an external video monitor; means for decoding the streaming data received by the receiver, in accordance with a decode request sent from the first processor via the bus; and means for outputting the decoded streaming data to the third interface unit, in accordance with a reproduction request sent from the first processor via the bus.

15. The information processing apparatus according to claim 13 further including a control bus to connect the receiver and the second processor, wherein the receiver is a tuner unit that receives broadcast content data composed of streaming data, and the second processor transmits, to the receiver via the control bus, control information indicative of to which channel broadcast program data to be received belongs, in accordance with a channel select request input from the first processor.

16. The information processing apparatus according to claim 13 wherein the streaming data is broadcast content data, and the receiver includes a tuner unit that receives the broadcast content data.

17. The information processing apparatus according to claim 13 wherein the information processing apparatus is coupled to a terminal via a network, and the information processing apparatus further includes a third processor coupled to the bus and communicating with the terminal on the network, the third processor issuing, to the second processor via the bus, a disk access request instructing the second processor to read out the streaming data from the disk storage device, to transmit the streaming data stored in the disk storage device to the terminal via the network.

18. The information processing apparatus according to claim 13 wherein the second processor includes:

a third interface unit that outputs video data to an external video monitor;

a fourth interface unit that receives display data from the first processor; and means for converting the display data received by the fourth interface unit to the video data, which is output to the external video monitor via the third interface unit, in accordance with a reproduction request sent from the first processor via the bus.

19. An information processing apparatus to record streaming data in a disk storage device, comprising:

a bus; a first processor that manages, as a file, data recorded in the disk storage device;

a receiver that receives externally supplied streaming data;

a second processor that executes, based on a disk access request input from the first processor, a write process to write data and file management information input via the bus into the disk storage device, and a read-out process to read out data constituting a file, which is stored in the disk storage device, onto the bus, the second processor including a first interface unit electrically coupled to the disk storage device, and a second interface unit electrically coupled to the receiver, and the second processor writing, when a disk access request from the first processor instructs writing the streaming data into the disk storage device, the streaming data input from the receiver to the second interface unit and file management information input from the first processor via the bus into the disk storage device via the first interface unit; and a third processor coupled to the bus and communicating with the terminal on the network, the third processor issuing, to the second processor via the bus, a disk access request instructing the second processor to read out the streaming data from the disk storage device, to transmit the streaming data stored in the disk storage device to the terminal via the network.

20. The information processing apparatus according to claim 19 wherein the streaming data is broadcast content data, and the receiver includes a tuner a unit that receives the broadcast content data.

21. The information processing apparatus according to claim 19 wherein the second processor includes a buffer memory assigned within a memory address space accessible by the first processor and temporarily stores the streaming data input to the second interface unit, and the first processor sends, to the second processor via the bus, an access request to instruct the second processor to write the data stored in the buffer memory into the disk storage device.

22. An information processing apparatus to record streaming data in a disk storage device, comprising;

a bus;

a first processor that manages, as a file, data recorded in the disk storage device;

a receiver that receives externally supplied streaming data; and a second processor that executes, based on a disk access request input from the first processor, a write process to write data and file management information input via the bus into the disk storage device, and a read-out process to read out data constituting a file, which is stored in the disk storage device, onto the bus, the second processor including a first interface unit electrically coupled to the disk storage device, and a second interface unit electrically coupled to the receiver, and the second processor writing, when a disk access request from the first processor instructs writing the streaming data into the disk storage device, the streaming data input from the receiver to the second interface unit and file management information input from the first processor via the bus into the disk storage device via the first interface unit, wherein second processor includes: a third interface unit that outputs video data to an external video monitor; a fourth interface unit that receives display data from the first processor; and means for converting the display data received by the fourth interface unit to the video data, which is output to the external video monitor via-the third interface unit, in accordance with a reproduction request sent from the first processor via the bus.

23. The information processing apparatus according to claim 22 wherein the streaming data is broadcast content data, and the receiver includes a tuner unit that receives the broadcast content data.

24. The information processing apparatus according to claim 22 wherein the second processor includes a buffer memory assigned within a memory address space accessible by the first processor and temporarily stores the streaming data input to the second interface unit, and the first processor sends, to the second processor via the bus, an access request to instruct the second processor to write the data stored in the buffer memory into the disk storage device.

25. A method of recording streaming data, comprising: issuing a channel instruction by a first processor to a second processor indicative of a channel number of broadcast content data to be received; transmitting control information, from the second processor to a receiver, indicative of a channel to which the broadcast content data to be received belongs, based on the channel instruction issued by the first processor; receiving the broadcast content data by the receiver and transmitting the broadcast content data to the second processor via a dedicated bus; writing the broadcast content data received by the second processor into a buffer memory; transmitting pointer information from the second processor to the first processor; generating a disk access request by the first processor based on the pointer information received from the second processor, and transmitting the disk access request to the second processor; and executing a process to write data into a storage device by the second processor based on the disk access request received from the first processor.

* * * * *